US006047886A

United States Patent [19]

Saltsov

[11] Patent Number: 6,047,886

[45] Date of Patent: Apr. 11, 2000

[54] VALIDATOR WITH REPLACEABLE SENSOR MODULE

[75] Inventor: Leon Saltsov, Thornhill, Canada

[73] Assignee: Cash Code Company Inc., Concord

[21] Appl. No.: 09/019,438

[22] Filed: Feb. 5, 1998

[51] Int. Cl.[7] ...................................................... G06F 17/60

[52] U.S. Cl. ............................................ 235/379; 235/475

[58] Field of Search ..................................... 235/449, 441, 235/462.01, 472.01, 379, 380, 382, 375, 479, 475, 478, 483

[56] References Cited

U.S. PATENT DOCUMENTS 4,236,639 12/1980 Von Aschwege .
4,820,912 4/1989 Samyn .................................... 235/449
4,922,109 5/1990 Feyjoo et al. .
4,973,851 11/1990 Lee .
5,155,643 10/1992 Jones, Jr. et al. ........................ 360/113
5,235,652 8/1993 Nally .
5,430,664 7/1995 McInerny .
5,657,847 8/1997 Tod et al. ................................ 194/207
5,842,188 11/1998 Ramsey et al. .......................... 705/416
5,907,141 5/1999 Deaville et al. ......................... 235/375
5,909,792 6/1999 Gerlier et al. .......................... 194/206
5,912,982 6/1999 Munro et al. ........................... 382/135

*Primary Examiner*—Thien M. Le

[57] ABSTRACT

The currency validator for assessing bank notes, comprises a housing combining an inlet for receiving bank notes, a scanning path along which a received bank note is moved for assessment, and a drive arrangement associated with the scanning path for moving bank notes along the path. Scanners of different types are provided in removable modules whereby the scanners and the position thereof can be varied by replacing the module with a different module.

9 Claims, 1 Drawing Sheet

FIG. 3. A-A

VALIDATOR WITH REPLACEABLE SENSOR MODULE

FIELD OF THE INVENTION

The present invention relates to currency validators and bill acceptors. In particular, the invention is directed to bill acceptors which can be easily modified such that the acceptor is not dedicated to a specific currency.

BACKGROUND OF THE INVENTION

Bill acceptors can generally be sub-divided into two groups, namely a universal type bill acceptor and bill acceptors which are currency specific. Universal bill acceptors achieve this result through the provision of sensors which are able to read data from large areas or by the provision of many standard type sensors. In the first case, the quality of recognition is negatively affected and in the second case, the cost for the unit is quite high.

It can be appreciated the advantages possible with the universal acceptor in that the cost per unit can generally drop due to the larger number of units being manufactured. However, the sophistication of the unit has to increase quite dramatically.

It is now generally the practice to design a particular bill acceptor for a particular national currency. Each currency validator involves some preliminary research to determine what areas are to be scanned and what combination of different type of sensors are effective in providing the necessary quality. In addition, most currency validators are designed to be very reliable. However, when service is required, it tends to be quite specific and requires skilled technicians.

SUMMARY OF THE INVENTION

A currency validator according to the present invention is used for assessing bank notes and currency and comprises a housing having an inlet, a scanning path along which a bank not is moved for assessment, a drive arrangement associated with the scanning path for moving the bank notes along the scanning path and an outlet location at an end of the path throughwhich the approved bank notes are passed. The housing is moveable to an open position to allow access to the scanning path. The scanning path provides a plurality of scanners of different types for scanning different characteristics of a bank note as it is driven along the path. The plurality of different sensors are contained in a removable module and the path is recessed to receive the removable modules. The module, when received in the device, positions the sensors appropriately relative to the path. The validator further includes a processing arrangement for receiving signals from the sensors to a terminal whether the bank note should be accepted.

With the bill acceptor is outlined above, any problems associated with sensors is easily checked by inserting a new module. In addition, it is easy to use this common bill acceptor and merely change the module to reposition the sensors for scanning of a different currency. It is apparent the processing arrangement which is basically software will also have to be changed, but this is somewhat straightforward given that the sensors have been easily rearranged and located appropriately for the given currency. With this arrangement, the manufacturing process is simplified and the ability to change an existing validator from one currency to another is easily accomplished.

According to a preferred aspect of the invention, the path is recessed on opposite sides thereof and the recess to one side of the path includes a first removable module and the recess to the other side of the path includes a second removable module.

According to yet a further aspect of the invention, these removable modules are preferably located opposite each other.

BRIEF DESCRIPTION OF THE DRAWINGS

Preferred embodiments of the invention are shown in the drawings, wherein:

FIG. 3 is a sectional view taken along line AA of FIG. 2.

DETAILED DESCRIPTION OF THE PREFERRED EMBODIMENTS

Figure 1:
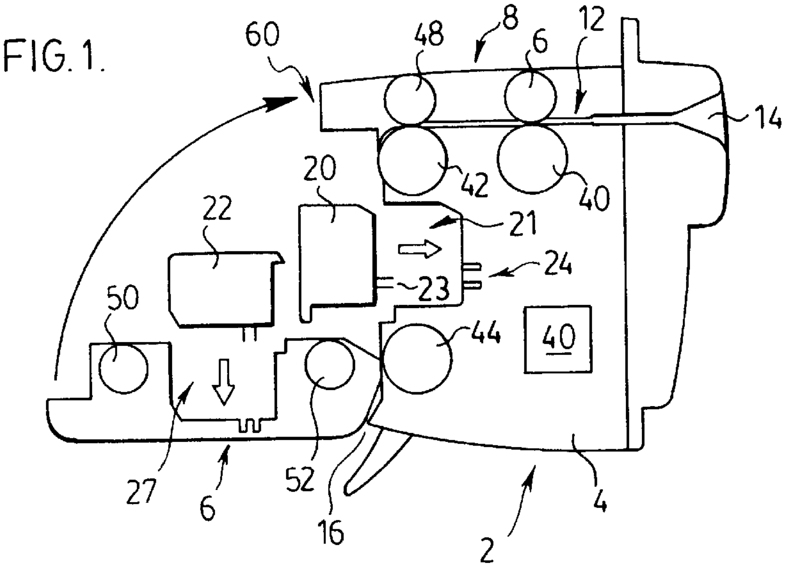
FIG. 1 is a side view showing details of the components of the validator.

The validator 2 of FIG. 1 shows various components for processing of the bill as it passes through the device. The validator includes a main body portion 4 with drive wheels 40, 42 and 44 which are connected to a motor, not shown. These drive wheels are all coordinated and drive the bill along the processing path 12 from the inlet 14 to the outlet 16. Attached to the main body 4 is a hinged side body 6 and a hinged top body 8. The hinged side body and hinged top body connect generally at 60 and define the outer side of the path 12. These hinged bodies include the idler wheels 46, 48, 50 and 52 associated with the drive wheels 40, 42 and 44.

Figure 2:
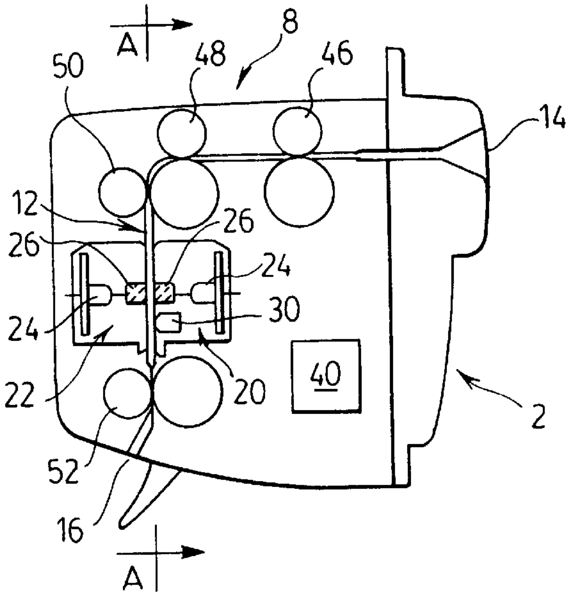
FIG. 2 is a view similar to FIG. 1 with the housing in a closed position.
Figure 2:
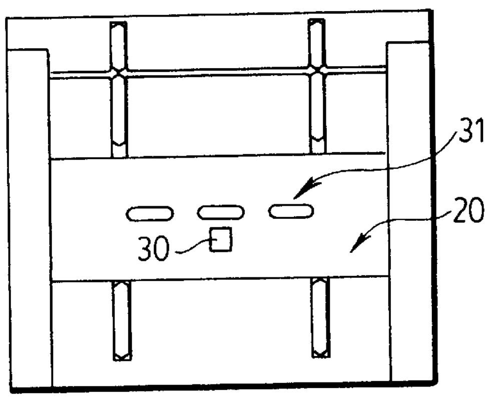

The main body 4 has a large recess 21 for receiving the cartridge or module 20. This module 20 as shown in FIG. 2 includes an optical sensor 24 and associated optical lens 26 and a magnetic head sensor 30. Module 20 is inserted into the recess 21 and connects with electronic components in the main body 4. This connection is made by the electrical connector 23 of the module 20 being received in the connector 24 associated with the recess 21.

A module 22 is received in the recess 27 provided in the hinged side body 6. Again, there is a suitable electrical connection between the module and the recess. Any suitable electrical connection may be used. The sensor insert modules 20 and 22 are of a standard dimension for the validator and the individual positions of the optical sensor 24 and the magnetic head sensor 30 is fixed within any given module. Different modules are available for different currencies and the position of the sensors varies according to the currency. In this way, the modules are designed for a given currency and the main body and side and top body members remain the same. In this way, the sensor modules 20 and 22 can be designed for a particular currency and can be kept in stock. When there is a need for a validator or bill acceptor suitable for U.S. currency, for example, the U.S. module is inserted in the generic validator. This same validator could have received a different module for a different currency.

The embodiment shown in FIG. 3 shows how the magnetic sensor 30 has been provided in a generally central location and an optical sensing arrangement 31 is provided at the central point. As can be appreciated, the module 20 can easily change from validator to validator and allows simplified manufacturing and the ability to meet demand quickly. The common components of the validator, i.e. the body, the drive arrangement, the microprocessors and the memory are generic, whereas the cartridges or modules 20 and 22 are currency specific. The microprocessor generally shown as 40 is generic, but is programmed according to what module is inserted into the device.

This arrangement also allows convenient upgrading of the sensing unit and the changing of the validator for different currency if required. Each module can have a plurality of locations for receiving and supporting optical and magnetic sensors. These locations allow convenient placement of the sensors for sensing a specific currency. Although various preferred embodiments of the present invention have been described herein in detail, it will be appreciated by those skilled in the art, that variations may be made thereto without departing from the spirit of the invention or the scope of the appended claims.

What is claimed is:

1. A currency validator for assessing banknotes comprising a housing containing an inlet, a scanning path along which a received banknote is moved for assessment, a drive arrangement associated with said scanning path for moving banknotes along said scanning path, and an outlet location at an end of said path through which approved banknotes are passed, said housing being movable to an open position exposing both sides of said scanning path for service, said scanning path including at least one removable sensor module which is located in a recess of said scanning path, each sensor module including a plurality of sensors of different types for scanning different characteristics of a banknote as it is driven along said path over said at least one removable sensor module, said path is recessed to receive said removable sensor module and position said sensors appropriately relative to said path, said validator further including a programmable processing arrangement for receiving signals from the sensors of said at least removable sensor module to determine whether the banknote should be accepted, said programmable processing arrangement being secured in said validator independently of said at least one removable sensor module and communicating with said at least one removable sensor module through an electrical plug type connection.

2. A currency validator as claimed in claim 1 wherein said path is recessed on opposite sides thereof and the recess to one side of said path includes a first removable sensor module and said recess to the other side of said path includes a second removable sensor module.

3. A currency validator as claimed in claim 2 wherein said first removable sensor module and said second removable sensor module are located opposite each other.

4. A currency validator as claimed in claim 1 wherein said at least one removable sensor module is designed for a particular currency and a replacement module is used for a different currency.

5. A currency validator as claimed in claim 1 including a series of removable modules where each module has sensors located for scanning a particular currency and said validator is changed for scanning a different currency by removal of one module and inserting a replacement module appropriate for the desired currency.

6. A currency validator as claimed in claim 2 wherein said modules have a common type of electrical plug connection with said validator.

7. A currency validator as claimed in claim 1 wherein said module is oversized and includes a plurality of locations for receiving an optical sensing arrangement, and a plurality of locations for receiving a magnetic sensing arrangement, whereby the sensors are positioned in appropriate locations for sensing a particular currency.

8. A currency validator as claimed in claim 1 wherein said at least one removable sensor module is removable from said recessed scanning path when said housing is in said open position.

9. A currency validator as claimed in claim 8 wherein said housing is a split housing which splits to expose both sides of said scanning path.

* * * * *